United States Patent [19]

Welschof et al.

[11] Patent Number: 4,493,388

[45] Date of Patent: Jan. 15, 1985

[54] BEARING ASSEMBLY FOR A VEHICLE WHEEL DRIVEN BY A ROTARY CONSTANT VELOCITY UNIVERSAL JOINT

[75] Inventors: Hans-Heinrich Welschof, Rodenbach; Rudolf Beier, Offenbach am Main, both of Fed. Rep. of Germany

[73] Assignee: Löhr & Bromkamp GmbH, Offenbach am Main, Fed. Rep. of Germany

[21] Appl. No.: 370,863

[22] Filed: Apr. 22, 1982

[30] Foreign Application Priority Data

Apr. 28, 1981 [DE] Fed. Rep. of Germany ....... 3116775

[51] Int. Cl.³ .............................................. B60K 17/24
[52] U.S. Cl. ..................................... 180/258; 464/145; 464/906; 308/448; 308/490; 308/544; 308/547
[58] Field of Search .............. 180/254, 255, 256, 257, 180/258, 259, 261, 262, 263, 250, 233, 70 R; 308/191, 178, 189 R; 464/145, 906 R, 178; 301/9 CN, 108, 111

[56] References Cited

U.S. PATENT DOCUMENTS

| | | | |
|---|---|---|---|
| 1,734,709 | 11/1929 | Bayley | 180/263 |
| 4,010,986 | 3/1977 | Otto | 308/189 R X |
| 4,047,770 | 9/1977 | Korenhof et al. | 308/191 |
| 4,275,799 | 6/1981 | Guimbretiere | 180/255 |
| 4,359,128 | 11/1982 | Krude | 180/258 |

FOREIGN PATENT DOCUMENTS

| | | |
|---|---|---|
| 1931300 | 10/1975 | Fed. Rep. of Germany . |
| 7509295 | 1/1978 | Fed. Rep. of Germany . |
| 2047846 | 12/1980 | United Kingdom . |

Primary Examiner—David M. Mitchell
Assistant Examiner—Mitchell J. Hill
Attorney, Agent, or Firm—Toren, McGeady and Stanger

[57] ABSTRACT

A wheel bearing assembly wherein the wheel is driven through a universal joint is arranged with the outer joint member of the universal joint in positive driving engagement with the inner bearing ring of the wheel bearing which is connected to drive the wheel hub.

5 Claims, 10 Drawing Figures

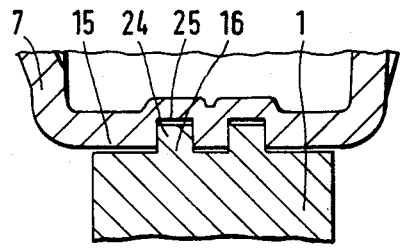
FIG.2
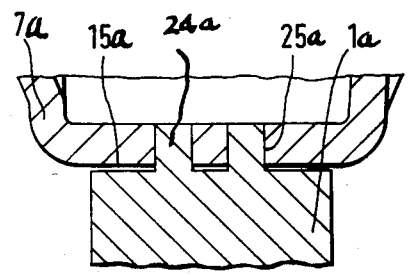
FIG.3
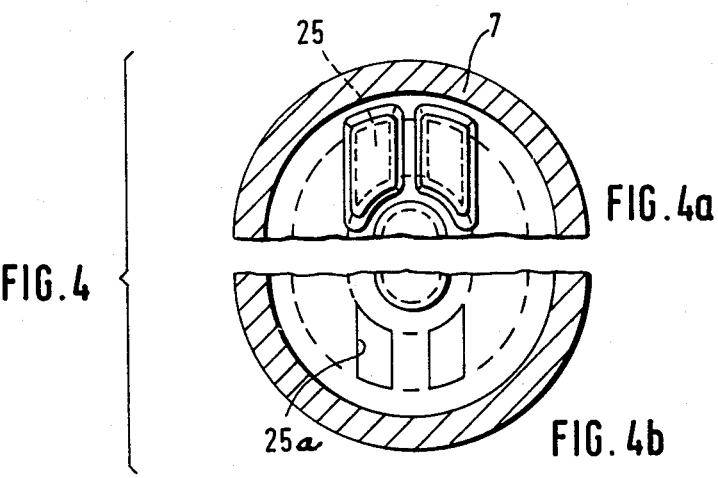
FIG.4 { FIG.4a / FIG.4b }

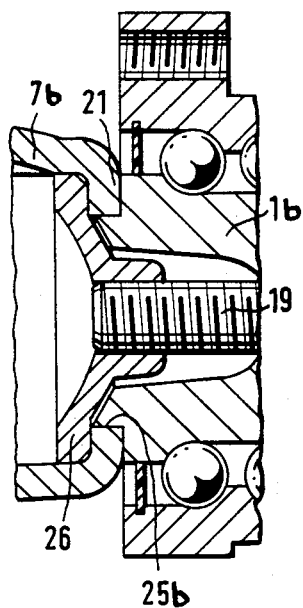
FIG.5
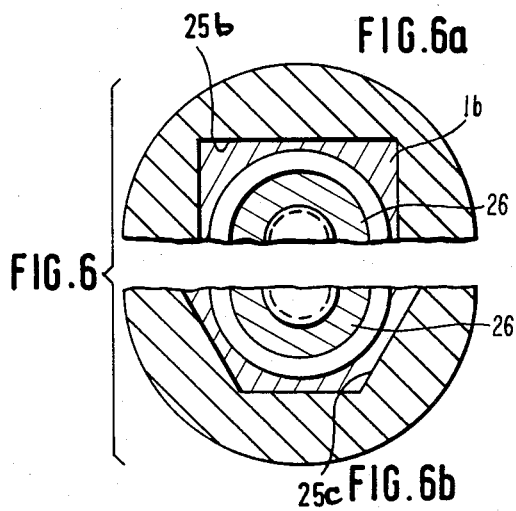
FIG.6 { FIG.6a / FIG.6b }

BEARING ASSEMBLY FOR A VEHICLE WHEEL DRIVEN BY A ROTARY CONSTANT VELOCITY UNIVERSAL JOINT The present invention relates generally to bearing assemblies for the wheels of motor vehicles and more particularly to an assembly for a wheel hub which is driven by a rotary constant velocity universal joint and which is arranged at the associated wheel carrier of the motor vehicle.

In assemblies of the type to which the present invention relates, the bearing is held by the wheel carrier and the wheel hub and the inner bearing ring of the bearing assembly are nonrotatively connected to the outer joint member of the rotary constant velocity universal joint. The inner bearing ring for the wheel hub and the outer joint member of the universal joint are held together by a centrally located bolt.

In joint assemblies of the prior art known, for example, from German Pat. No. 19 31 300, provision is made for a wheel bearing wherein the universal joint is capable of transferring torque through end splines to the inner bearing rings and from the inner bearing rings through further end splines to the wheel hub. However, in devices of this type it is particularly difficult to ensure concentric operation of the various components of the assembly relative to each other. Additionally, wheel contact forces, lateral forces, and bending moments of the wheel must be accommodated.

It is also significant to consider that in such prior art devices, a large number of components is required not only to enable the torque to be adequately transmitted, but also to permit accurate design of the actual bearing assembly. In order to allow forces occurring at the wheel to be adequately accommodated, accurate positioning and fixing of the components relative to each other must be ensured. Definite adjustment of the play of the actual wheel bearing is not possible, as the fixing elements must also absorb the forces occurring in the bearing.

The present invention is therefore directed toward provision of a wheel bearing assembly which consists of a pair of finish-assembled units wherein the end face of an outer joint member of a universal joint may serve to tension, adjust the play of, and axially fix the wheel bearing. Additionally, the present invention is aimed toward providing an assembly wherein the joint may largely be produced by utilization of techniques which do not involve metal cutting, i.e., non-chip forming techniques, while at the same time making it possible to produce a unit with a shorter axially length than is normally obtained.

SUMMARY OF THE INVENTION

Briefly, the present invention may be described as an improvement in an assembly for the hub of a wheel of a motor vehicle including wheel bearing means having an inner and an outer wheel bearing ring, the inner bearing ring being in driving connection with the wheel hub, universal joint means for driving the wheel hub through the inner bearing ring, said universal joint means including an inner joint member and an outer joint member, with the outer joint member being in driving connection with said inner bearing ring, and centrally located bolt means connected between the wheel hub and the outer joint member. The specific improvement of the invention comprises that the wheel bearing means and the universal joint means are constructed as two separate units, that the inner bearing ring and the outer joint member are braced against each other in opposed facing relationship, and that positive locking means are provided between the inner bearing ring and the outer joint member in order to connect together in driving relationship the universal joint means and the wheel hub.

Thus, in accordance with the present invention, the objectives of the invention are achieved in that (1) the bearing assembly and the universal joint are formed as two separate units, (2) the ends of the inner bearing ring or a nose of the wheel hub carrying the single-component or multi-component inner bearing ring, and a nose of the outer joint member are joined together by a positive locking connection, and (3) the outer joint member may be pretensioned relative to the inner bearing ring.

The advantage of using a design having a positive locking connection is that there does not result large dimensions in the axial direction such as are caused by conventional methods of production. Additionally, the positive locking connection may be provided directly together with production of the outer joint part with the manufacturing techniques utilized involving techniques which do not require metal cutting, i.e., non-chip forming techniques. The production method utilized may be a pressing method, punching, coining, or cold extruding.

A further advantage of a structure in accordance with the present invention is that the positive locking connection which is provided is utilized for transmitting torque. If the inner bearing ring is formed in two parts, the play in the wheel bearing assembly may be adjusted by means of an outer shoulder of the outer joint member. If the inner bearing ring consists of one part, then the outer joint member will operate to ensure axial fixing. This advantageous feature may be utilized because the positive locking connection will provide some freedom in the axial direction. Transmission of torque, on the other hand, requires that there should be practically no play whatever in the circumferential direction.

A simple, low cost connection providing a positive locking function may be achieved in that one end of the parts to be connected together will have several circumferentially spaced recesses into which projections formed on the other end will engage.

The advantage of such a design is that the recesses are provided on a radially outer part of the diameter of the member on which they are formed so that in the center of the end face of this member there will reamin sufficient space and material for providing a threaded opening or hole suitable for affixing the inner bearing ring or the wheel hub.

In accordance with a further essential feature of the invention, one of the end face of the parts to be connected is formed with a central recess which may deviate from a circular cross-sectional configuration into which a projection of the upper end face will engage.

In this embodiment, the recess deviating from the circular cross-section is made large and may be produced in the end face by a precision punching operation or the like whereby torque may be transmitted. This recess may have a square, a hexagonal, or other polygonal cross-sectional configuration. Axial fixing between the outer joint member and the inner bearing ring will be accomplished by means of an additional part arranged in the joint interior, such part comprising a device such as a disc or the like into which a bolt may engage.

In accordance with a further important feature of the invention, provision is made so that when several recesses are utilized, there will be provided a central nose for receiving a thread into which the fixing bolt may engage for bracing or holding the inner bearing ring and the outer joint member together.

In a preferred embodiment of the invention, the center of the members which are to be joined together may be designed as a nose with the fixing thread being provided in this nose and with the capacity being provided on the nose for forming a centering face. Axial play of the nose in a sufficiently large bore ensures adjustment of the play of the bearing rings and the fixing of the bearing by means of the outer shoulder of the outer joint member.

Low cost production of the positive locking connection may be achieved by a further feature of the invention which provides for the recesses to be structured as through holes. These through holes may be produced by a precise punching operation so that there will not be required a particular expenditure if the outer joint member is produced of plate metal or by cold forming. Cold forming of the joint parts is particularly advantageous if ball grooves which are free of undercut are provided.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DESCRIPTION OF THE DRAWINGS

In the drawings:

FIG. 2 is a sectional view illustrating a connection between the outer joint member of the universal joint and the inner bearing ring of the wheel bearing assembly;

FIG. 3 is a sectional view showing another embodiment of the connection depicted in FIG. 2;

FIG. 4 is a sectional end view wherein in FIG. 4a there is shown a connection of the type depicted in FIG. 2 and in FIG. 4b there is shown a connection of the type depicted in FIG. 3;

FIG. 5 is a sectional view of a further embodiment of the invention; and

FIG. 6 is a sectional view wherein in FIG. 6a there is shown an end view of one type of configuration of the connection shown in FIG. 5 and in FIG. 6b there is shown a modification of such a connection.

DETAILED DESCRIPTION OF THE PREFERRED EMBODIMENTS

Figure 1:
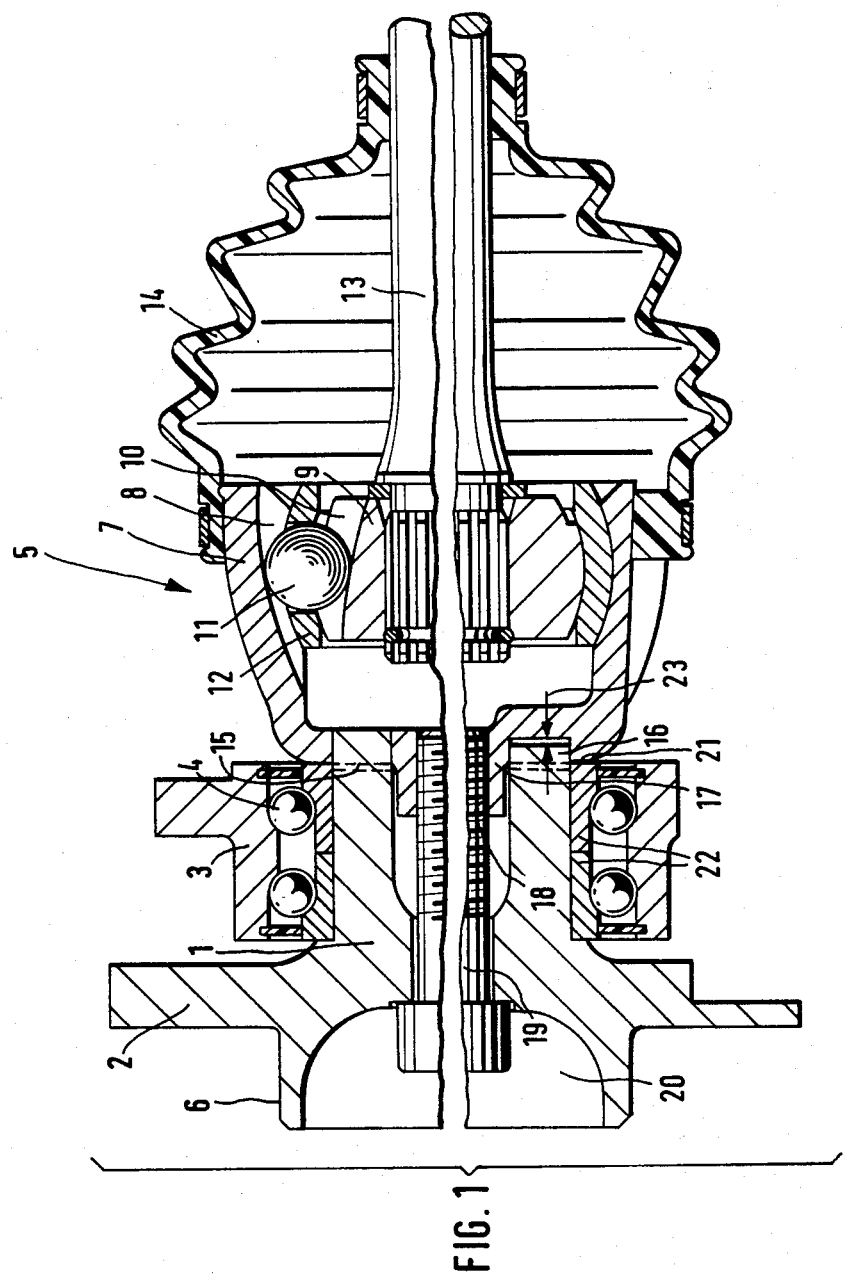
FIG. 1 is an axial sectional view of an assembly in accordance with the present invention including a wheel bearing assembly with an axially fixed universal driving joint.

Referring now to the drawings, and particularly to FIG. 1, there is shown an assembly in accordance with the present invention which comprises a wheel bearing assembly shown to the left in FIG. 1 and a universal joint assembly 5 shown to the right. The wheel bearing assembly includes an inner bearing ring 1 which, as shown in FIG. 1, is formed in the configuration of a nose or axially elongated part having annular bearing elements 22 mounted thereon. The inner bearing ring 1 carrying the annular bearing elements 22 is designed so as to be integrally formed with a wheel hub 2. The annular bearing elements 22 and an outer bearing ring 3 are provided with running tracks for rolling members 4 with the parts being configured in such a way that a double-row angular contact ball bearing (a so-called radiax bearing) is produced.

On the end thereof away from the universal joint 5, the inner bearing ring 1 is formed with a centering seat 6 which is adapted to receive a brake disc (not shown).

The universal joint 5 includes an outer joint member 7 which has formed on the inner surface thereof grooves 8 and which is also provided with grooves 10 formed on the outer surface of an inner joint member 9 of the universal joint 5. A cage 12 is located radially between the inner and outer joint members 9, 7 and torque transmitting balls 11 are guided in the windows of the cage 12 and are received in each of the grooves 8 and 10, respectively, of the outer joint member 7 and the inner joint member 9.

The inner joint member 9 is formed with a bore in which a profiled shaft 13 is received, the shaft 13 being in torque transmitting engagement with the inner joint member 9 by means of splines, longitudinal teeth, or similar interconnecting means.

The universal joint 5 is sealed by means of a bellows 14 to prevent dirt or other deleterious materials from entering the inner part of the joint.

The outer joint member 7 has defined thereon an end fact 15 upon which there is provided means for effecting a positive locking connection 16 which operates between the outer joint member 7 and the inner bearing ring 1 of the wheel bearing assembly. The end face of the inner bearing ring 1 is structured to have formed thereon positive locking means which will cooperate with similar or complementary positive locking means formed on the end face 15 of the outer joint member 7, in a manner to be described more fully hereinafter.

The positive locking connection 16 serves to transmit torque between the universal joint 5 and the inner bearing ring 1 of the wheel bearing assembly thereby to drive the wheel hub 2. At the center of the end face 15 of the outer joint member 7 there is provided a nose 17 which is formed with a threaded bore 18. A bolt 19 extending through the wheel hub 2 is threadedly engaged into the bore 18 and the bolt 19 is arranged so as to be accessible from the central bore 20 of the wheel hub 2. The central bore 20 may be reached through a center bore of the vehicle wheel (not shown) so that it may be possible to unfasten or assemble the drive shaft together with the universal joint 5 from the exterior of the vehicle.

The outer joint member 7 is formed with a shoulder 21 which rests against the annular bearing elements 22 of the radiax bearing and which serves to accurately adjust the entire bearing. Adjusting play in this manner is possible since axial freedom of movement is provided as indicated by a gap 23 which is formed between the end face 15 of the outer joint member 7 and the end face of the inner bearing ring 1. The universal joint is centered by the nose 17 in its receiving bore.

As previously indicated, a positive locking connection is provided between the end faces of the outer joint member 7 and the inner bearing ring 1. The locking connection is seen more clearly in FIG. 2 which is a sectional view showing in greater detail the connection between the outer joint member 7 and the inner bearing ring 1. The positive locking connection illustrated in FIG. 2 is in a form including projections 24 and recesses 25. The projections 24 and the recesses 25, as well as the end face 15, taken as a whole have been designed to provide for axial play. The projections 24 as well as the recesses 25 may be provided in the plate metal parts directly by cold forming. It will be apparent that as a result of the engagement between the projections 24 and the recesses 25, the outer joint member 7 will be in driving engagement with the inner bearing ring 1.

Another modification of the positive locking connection 16 provided between the members 7 and 1 is depicted in FIG. 3 which shows an embodiment generally similar to that illustrated in FIG. 2, the difference being that the recesses 25 are formed instead as through holes 25a so that there will thus be provided assurances that axial play will be enabled. As indicated in FIG. 3, the outer joint member 7a is formed with the through holes 25a and the inner bearing ring 1a has formed on its end face 15a the projections 24a which are adapted to be received within the holes 25a.

FIG. 4 is a composite view which shows in end view the configurations of the locking connections depicted in FIGS. 2 and 3. FIG. 4a is an end view of the locking connection of FIG. 2 and FIG. 4b is an end view of the locking connection of FIG. 3. As indicated in these figures, the shape of the recesses and through holes 25, 25a is shown and the manner whereby the positive locking connection between the outer joint member 7, 7a and the inner bearing ring 1, 1a is formed is also depicted.

FIGS. 5 and 6 show a further embodiment of the invention in a case wherein the outer joint member 7b is connected to the inner bearing ring 1b by the bolts 19. However, the recesses are formed as a central recess 25b so that an additional intermediate element 26 may be provided for effecting connection between the member 7b and the ring 1b.

The end view of the embodiment depicted in FIG. 5 is shown in FIG. 6 which is a composite figure wherein in FIG. 6a there is shown a recess 25b which is formed with a generally square configuration. In FIG. 6b a modification of the shape of this recess is shown and it will be seen that the recess may be formed as a hexagonal recess 25c. A shoulder 21 of the outer joint member 7b is provided for purposes of fixing the bearing.

While specific embodiments of the invention have been shown and described in detail to illustrate the application of the inventive principles, it will be understood that the invention may be embodied otherwise without departing from such principles.

What is claimed is:

1. In an assembly for the hub of a wheel of a motor vehicle including wheel bearing means having an inner and an outer wheel bearing ring, said inner bearing ring being in driving connection with said wheel hub, universal joint means for driving said wheel hub through said inner bearing ring, said universal joint means including an inner joint member and an outer joint member, with said outer joint member being in driving connection with said inner bearing ring, and centrally located bolt means connected between said wheel hub and said outer joint member, the improvement comprising:

that said wheel bearing means and said universal joint means are constructed to comprise two separate units which can be operationally separated from each other without requiring disassembly of either of said units;

that said bolt means is arranged to extend therebetween to adjustably join said units together;

that said inner bearing ring and said outer joint member are supported against each other in opposed facing relationship;

that positive locking means are provided between said inner bearing ring and said outer joint member in order to connect them together in torque-transmitting relationship to effect a driving engagement between said universal joint means and said wheel hub;

that said positive locking means comprise projections formed in one of said inner bearing ring and said outer joint member and recesses formed in the other for receiving said projections;

that said positive locking means are structured to engage said inner bearing ring and said outer joint member without circumferential play therebetween while allowing axial play therebetween; and that said bolt means is in threaded engagement between said wheel hub and said outer joint member to enable adjustment of said axial play.

2. An assembly according to claim 1 wherein said projections comprise a plurality of circumferentially spaced projections and said recesses comprise a complementary plurality of circumferentially spaced recesses within which said projections are engaged.

3. An assembly according to claim 1 wherein said outer joint member is formed with a central nose having a threaded inner bore into which said centrally located bolt means are received in threaded engagement for supporting said inner bearing ring against said outer joint member.

4. An assembly according to claim 1 wherein said recesses are formed as through holes extending through said other of said outer joint member and inner bearing ring.

5. In an assembly for the hub of a wheel of a motor vehicle including wheel bearing means having an inner and an outer wheel bearing ring, said inner bearing ring being in driving connection with said wheel hub, universal joint means for driving said wheel hub through said inner bearing ring, said universal joint means including an inner joint member and an outer joint member, with said outer joint member being in driving connection with said inner bearing ring, and centrally located bolt means connected between said wheel hub and said outer joint member, the improvement comprising:

that said wheel bearing means and said universal joint means are constructed to comprise two separate units which can be operationally separated from each other without requiring disassembly of said units;

that said bolt means is arranged to extend therebetween to adjustably join said units together;

that said inner bearing ring and said outer joint member are supported against each other in opposed facing relationship;

that positive locking means are provided between said inner bearing ring and said outer joint member in order to connect them together in torque-transmitting relationship to effect a driving engagement between said universal joint means and said wheel hub;

that said positive locking means comprise a central recess formed in one of said inner bearing ring and said outer joint member and a central projection adapted to engage within said central recess formed in the other of said inner bearing ring and said outer joint member, said recess and said projection being shaped with a cross-sectional configuration which deviates from a circular configuration;

that said positive locking means are structured to engage said inner bearing ring and said outer joint member without circumferential play therebetween while allowing axial play therebetween; and that said bolt means is in threaded engagement between said wheel hub and said outer joint member to enable adjustment of said axial play.

* * * * *